United States Patent
Sakurai et al.

(10) Patent No.: US 9,794,274 B2
(45) Date of Patent: Oct. 17, 2017

(54) INFORMATION PROCESSING APPARATUS, INFORMATION PROCESSING METHOD, AND COMPUTER READABLE MEDIUM

(71) Applicant: MITSUBISHI ELECTRIC CORPORATION, Tokyo (JP)

(72) Inventors: Shoji Sakurai, Tokyo (JP); Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/502,969

(22) PCT Filed: Sep. 8, 2014

(86) PCT No.: PCT/JP2014/073691
§ 371 (c)(1),
(2) Date: Feb. 9, 2017

(87) PCT Pub. No.: WO2016/038662
PCT Pub. Date: Mar. 17, 2016

(65) Prior Publication Data
US 2017/0237751 A1  Aug. 17, 2017

(51) Int. Cl.
*H04L 29/06* (2006.01)

(52) U.S. Cl.
CPC .... *H04L 63/1408* (2013.01); *H04L 2463/121* (2013.01)

(58) Field of Classification Search
CPC .............. H04L 63/1408; H04L 2463/121
See application file for complete search history.

(56) References Cited

U.S. PATENT DOCUMENTS 6,279,113 B1 * 8/2001 Vaidya ............... H04L 63/1416
709/229
8,307,430 B1 * 11/2012 Chen .................. H04L 63/1416
726/22

(Continued)

FOREIGN PATENT DOCUMENTS

JP   2005-57522 A    3/2005
JP   2005-229573 A   8/2005

(Continued)

*Primary Examiner* — Chau Le
*Assistant Examiner* — Muhammad Chaudhry
(74) *Attorney, Agent, or Firm* — Birch, Stewart, Kolasch & Birch, LLP

(57) ABSTRACT

An attack detection apparatus (6) collects packets a transmission source or a transmission destination of which is a protection target apparatus (5), and generates packet information by setting an entry for each collected packet and describing attribute data of the packet together with occurrence time of the packet for each entry. Further, the attack detection apparatus (6) stores definition information which defines an extraction time width and an extraction condition for each category of attack. When a security apparatus (4) detects a packet which corresponds to any category, the attack detection apparatus (6) selects the extraction time width and the extraction condition of a category of a detection packet detected as a selection extraction time width and a selection extraction condition, specifies an extraction time range which starts from the occurrence time of the detection packet and whose width is equal to the selection extraction time width, extracts from the packet information an entry the occurrence time of which is included in the extraction time range and the attribute data of which coincides with the selection extraction condition, and determines presence or absence of an attack to the protection target apparatus (5) based on an extraction result.

8 Claims, 18 Drawing Sheets

(56) References Cited

U.S. PATENT DOCUMENTS

| | | | | |
|---|---|---|---|---|
| 8,331,374 | B2* | 12/2012 | Zuk | H04L 63/0227 370/392 |
| 8,339,959 | B1* | 12/2012 | Moisand | H04L 63/0236 370/235 |
| 2004/0215972 | A1* | 10/2004 | Sung | H04L 63/1408 726/23 |
| 2005/0182950 | A1 | 8/2005 | Son et al. | |
| 2005/0204171 | A1* | 9/2005 | Belenky | H04L 63/1441 726/5 |
| 2006/0037077 | A1* | 2/2006 | Gadde | H04L 63/168 726/23 |
| 2006/0288413 | A1 | 12/2006 | Kubota | |
| 2007/0067839 | A1 | 3/2007 | Hamada et al. | |

FOREIGN PATENT DOCUMENTS

| | | |
|---|---|---|
| JP | 2006-148778 A | 6/2006 |
| JP | 2006-352669 A | 12/2006 |
| JP | 2007-164313 A | 6/2007 |
| JP | 2007-235879 A | 9/2007 |
| JP | 2009-135649 A | 6/2009 |
| JP | 2010-152773 A | 7/2010 |
| JP | 2011-198149 A | 10/2011 |
| WO | 2006/046345 A1 | 5/2006 |

\* cited by examiner

Fig. 7

PACKET INFORMATION

| 31 | 32 | 33 | 34 | 35 | 36 | 37 | 38 | 39 |
|---|---|---|---|---|---|---|---|---|
| No. | TIME | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL | LENGTH | INFORMATION |
| 1 | 2014.6.28 13:26:15.0001 | 10.0.0.100 | 51355 | 192.168.1.10 | 80 | TCP | 62 | [SYN] |
| 2 | 2014.6.28 13:26:15.0003 | 192.168.1.10 | 80 | 10.0.0.100 | 51355 | TCP | 62 | [SYN, ACK] |
| 3 | 2014.6.28 13:26:15.0004 | 10.0.0.100 | 51355 | 192.168.1.10 | 80 | TCP | 54 | [ACK] |
| 4 | 2014.6.28 13:26:15.0015 | 10.0.0.100 | 51355 | 192.168.1.10 | 80 | HTTP | 161 | GET /restricted/ HTTP/1.0 |
| 5 | 2014.6.28 13:26:15.0018 | 192.168.1.10 | 80 | 10.0.0.100 | 51355 | TCP | 54 | [ACK] |
| 6 | 2014.6.28 13:26:15.0021 | 192.168.1.10 | 80 | 10.0.0.100 | 51355 | HTTP | 733 | HTTP/1.1 401 Authorization Required |
| 7 | 2014.6.28 13:26:15.0026 | 10.0.0.100 | 51355 | 192.168.1.10 | 80 | HTTP | 208 | GET /restricted/ HTTP/1.0 |
| 8 | 2014.6.28 13:26:15.0031 | 192.168.1.10 | 80 | 10.0.0.100 | 51355 | HTTP | 360 | HTTP/1.1 200 OK |
| .. | .. | .. | .. | .. | .. | .. | .. | .. |

Fig. 8

PROTECTION TARGET APPARATUS-TABLE

| No. | IP ADDRESS | CLASSIFICATION | USAGE | PORT NUMBER |
|---|---|---|---|---|
| 1 | 192.168.1.10 | SERVER | Web | 80, 443 |
| 2 | 192.168.1.11 | SERVER | Mail | 25 |
| 3 | 192.168.1.12 | SERVER | NTP | 123 |
| 4 | 192.168.1.13 | SERVER | DNS | 53 |
| 5 | 192.162.2.0/24 | TERMINAL | — | — |
| | | | | |

Fig. 9

CHECK POINT FILE

| SIGNATURE ID | ATTACK TYPE | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | CHECK TIME PERIOD | SIZE | DETERMINATION CRITERION |
|---|---|---|---|---|---|---|---|---|
| 1 | Exploit | Any | Any | $DST_ADDR | $DST_PORT | 600:600 | Any | Any, +30%, AND |
| 2 | Blacklist | $SRC_ADDR | Any | Any | [80,443] | 0:600 | Same | ≧100, Any, AND |
| 3 | Malware | $DST_ADDR | ~[80,443] | Any | Any | 0:600 | Any | ≧1, Any, AND |

51  52  53  54  55  56  57  58  59

270

Exploit:
IF ATTACKER SUCCEEDS TO ENTER PROTECTION TARGET APPARATUS, COMMUNICATION FROM ATTACKER TO PORT OF PROTECTION TARGET APPARATUS IS OPERATED TO UPLOAD FILE FOR ESTABLISHING BASIS. THUS, INCREASE IN COMMUNICATION AMOUNT IS OBSERVED.

Blacklist:
IF THERE IS COMMUNICATION BETWEEN SITE REGISTERED IN BLACK LIST AND PROTECTION TARGET APPARATUS, COMMUNICATION IS PERIODICALLY OPERATED FOR REMOTE CONTROL. THUS, MANY EXTERNAL COMMUNICATIONS OF PACKETS WHOSE SIZES ARE SAME ARE OBSERVED.

Malware:
IF MALWARE IS DETECTED, UNAPPROVED COMMUNICATION FROM PROTECTION TARGET APPARATUS TO OUTSIDE IS OBSERVED.

INFORMATION PROCESSING APPARATUS, INFORMATION PROCESSING METHOD, AND COMPUTER READABLE MEDIUM

TECHNICAL FIELD

The present invention relates to an attack detection system.

BACKGROUND ART

A conventional attack detection system checks how a packet operates on a verification network, the packet being detected by a security apparatus and suspected to be an attack packet. Then, the conventional attack detection system determines whether or not the packet is the attack packet (for example, Patent Literature 1).

CITATION LIST

Patent Literature

Patent Literature 1: JP 2005-057522 A

SUMMARY OF INVENTION

Technical Problem

In the conventional attack detection system, a problem arises that the verification network needs to be provided other than a protection target network.

Further, the verification network is a different network from the protection target network. Thus, even if the verification using the verification network determines that an attack on the protection target network does not occur, there is a case where the attack on the protection target network actually occurs.

Further, on the contrary, even if the verification using the verification network determines that the attack on the protection target network occurs, there is a case where the attack on the protection target network does not actually occur.

As just described, there is a problem in the conventional attack detection system that detection leakage or a detection error caused by using the verification network may occur.

The present invention mainly aims to solve a problem such as above and aims to obtain a configuration which can detect an attack packet without using a verification network.

Solution to Problem

An information processing apparatus collecting a packet a transmission source of which is a protection target apparatus and a packet a transmission destination of which is the protection target apparatus, the information processing apparatus according to the present invention includes:

a packet information generation unit to generate packet information by setting an entry for each collected packet and describing attribute data of the packet together with occurrence time of the packet for each entry;

a definition information storage unit to store definition information which indicates a plurality of categories of attack and defines an extraction time width and an extraction condition for each category;

a selection unit to select, when a packet which corresponds to any category of the plurality of categories is detected from among the packet the transmission source of which is the protection target apparatus and the packet the transmission destination of which is the protection target apparatus, the extraction time width and the extraction condition defined in the definition information as a selection extraction time width and a selection extraction condition with respect to a category of a detection packet detected, and to specify an extraction time range which starts from the occurrence time of the detection packet and whose width is equal to the selection extraction time width;

an extraction unit to extract from the packet information an entry the occurrence time of which is included in the extraction time range and the attribute data of which coincides with the selection extraction condition; and a determination unit to determine presence or absence of an attack to the protection target apparatus based on an extraction result of the extraction unit.

Advantageous Effects of Invention

The present invention determines the presence or absence of an attack to a protection target apparatus, based on an extraction time width and an extraction condition defined for each category of attack and based on attribute data of a collected packet.

Accordingly, the present invention can determine the presence or absence of the attack to the protection target apparatus without providing a verification network.

Further, the present invention determines the presence or absence of the attack to the protection target apparatus depending on an analysis for a packet a transmission source of which is the protection target apparatus and a packet a transmission destination of which is the protection target apparatus. Thus, detection leakage or a detection error can be avoided.

BRIEF DESCRIPTION OF DRAWINGS

FIG. 7 is a diagram illustrating an example of packet information according to the first embodiment.

FIG. 8 is a diagram illustrating an example of a protection target apparatus-table according to the first embodiment.

FIG. 9 is a diagram illustrating an example of a check point file according to the first embodiment.

DESCRIPTION OF EMBODIMENTS

First Embodiment

Figure 1:
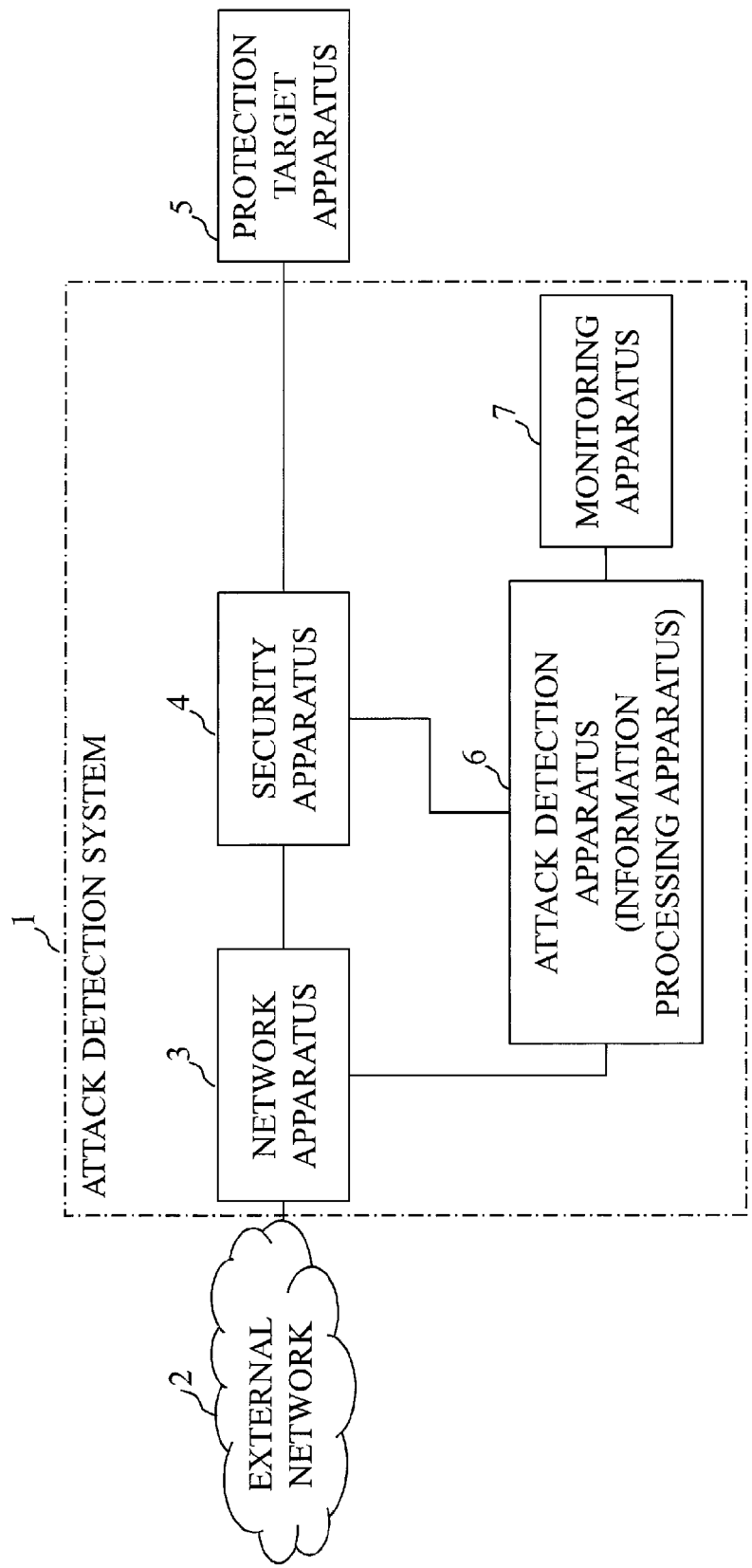
FIG. 1 is a diagram illustrating a configuration example of an attack detection system according to a first embodiment.

FIG. 1 is a diagram illustrating a system configuration example of an attack detection system 1 according to the present embodiment.

In the attack detection system 1 of FIG. 1, a network apparatus 3 connected to an external network 2 is connected to a protection target apparatus 5 through a security apparatus 4.

Further, the network apparatus 3 is connected to a monitoring apparatus 7 through an attack detection apparatus 6.

The security apparatus 4 is also connected to the attack detection apparatus 6.

Here, the protection target apparatus 5 is a computer such as a PC (Personal Computer) or a server.

The protection target apparatus 5 communicates with a computer (not illustrated) on the external network 2 through the network apparatus 3 and the security apparatus 4.

In FIG. 1, only one protection target apparatus 5 is illustrated, but a plurality of protection target apparatuses 5 may exist.

The network apparatus 3 is an apparatus such as a network router or a network switch that relays a communication packet.

The network apparatus 3 is set to transfer to the attack detection apparatus 6 all of packets that are communicated between the external network 2 and the security apparatus 4.

That is, the network apparatus 3 transfers to the attack detection apparatus 6 a packet a transmission source of which is the protection target apparatus 5 and a packet a transmission destination of which is the protection target apparatus 5.

The security apparatus 4 is an apparatus such as an Intrusion Detection System (IDS), an Intrusion Prevention System (IPS), an Unified Threat Management (UTM), or an anti-virus gateway apparatus.

Further, the security apparatus 4 is set to transmit an alert to the attack detection apparatus 6 when detecting a suspicious packet that is suspected of attacking the protection target apparatus 5.

The attack detection apparatus 6 receives the packet transferred from the network apparatus 3.

In other words, the attack detection apparatus 6 collects the packet the transmission source of which is the protection target apparatus 5 and the packet the transmission destination of which is the protection target apparatus 5.

Further, the attack detection apparatus 6 records attribute data of the packet received from the network apparatus 3.

Then, when the suspicious packet is detected by the security apparatus 4 and the alert is transmitted from the security apparatus, the attack detection apparatus 6 analyzes the attribute data of the recorded packet and determines the presence or absence of an attack by the suspicious packet to the protection target apparatus 5.

The attack detection apparatus 6 corresponds to an example of an information processing apparatus.

Figure 2:
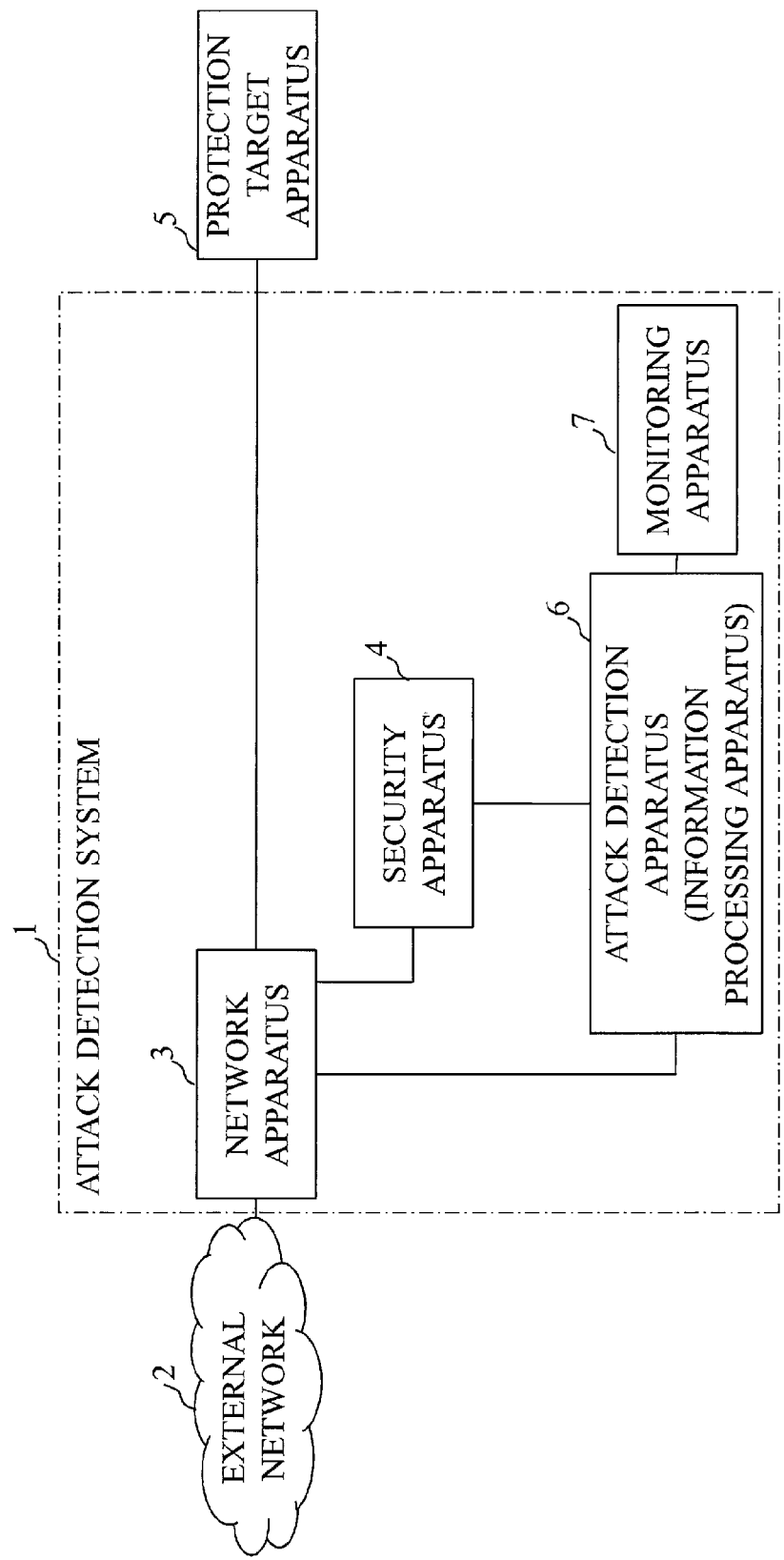
FIG. 2 is a diagram illustrating another configuration example of the attack detection system according to the first embodiment.

FIG. 2 is a diagram illustrating another system configuration example of the attack detection system 1 according to the present embodiment.

In the configuration example of FIG. 2, the network apparatus 3 and the protection target apparatus 5 are connected directly without thorough the security apparatus 4.

Each apparatus in FIG. 2 is the same as those illustrated in FIG. 1.

Further, as another system configuration example of the attack detection system 1, the security apparatus 4 can be connected to the attack detection apparatus 6 through the network apparatus 3 instead of being connected directly to the attack detection apparatus 6.

Figure 3:
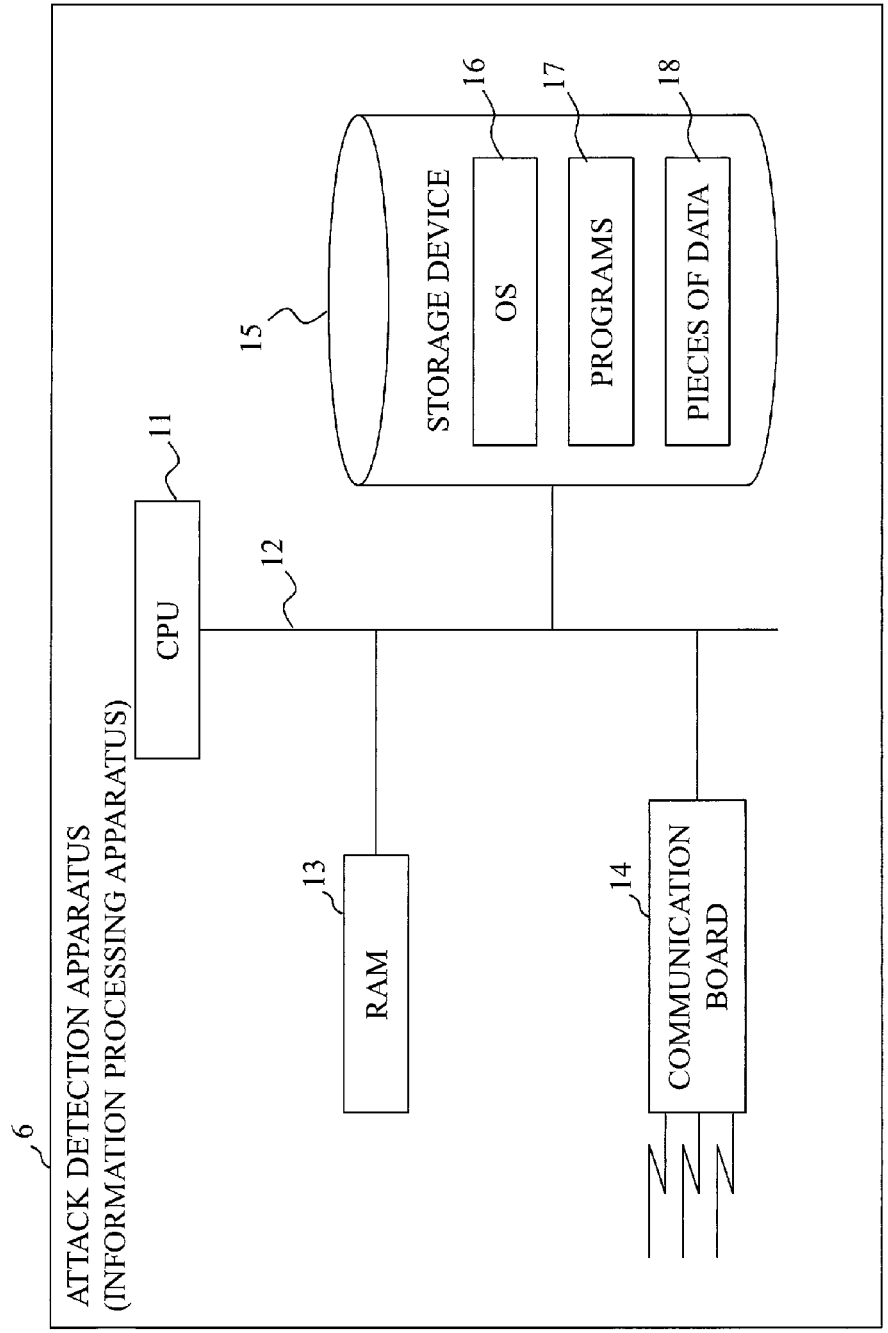
FIG. 3 is a diagram illustrating a hardware configuration example of an attack detection apparatus according to the first embodiment.

FIG. 3 is a diagram illustrating an example of hardware resources of the attack detection apparatus 6.

In FIG. 3, the attack detection apparatus 6 includes a CPU (Central Processing Unit) 11 that executes a program.

The CPU 11 is connected through a bus 12 to a RAM (Random Access Memory) 13, a communication board 14, and a storage device 15 configured with a magnetic disk device, a flash memory, or an SSD (Solid State Drive). The CPU 11 controls these hardware devices.

The communication board 14 is connected to the network apparatus 3, the security apparatus 4, and the monitoring apparatus 7 through a transmission medium such as a LAN (Local Area Network) cable.

The storage device 15 stores an OS (Operating System) 16, programs 17, and pieces of data 18. The OS 16 and the programs 17 are loaded onto the RAM 13 from the storage device 15 and executed by the CPU 11.

Figure 4:
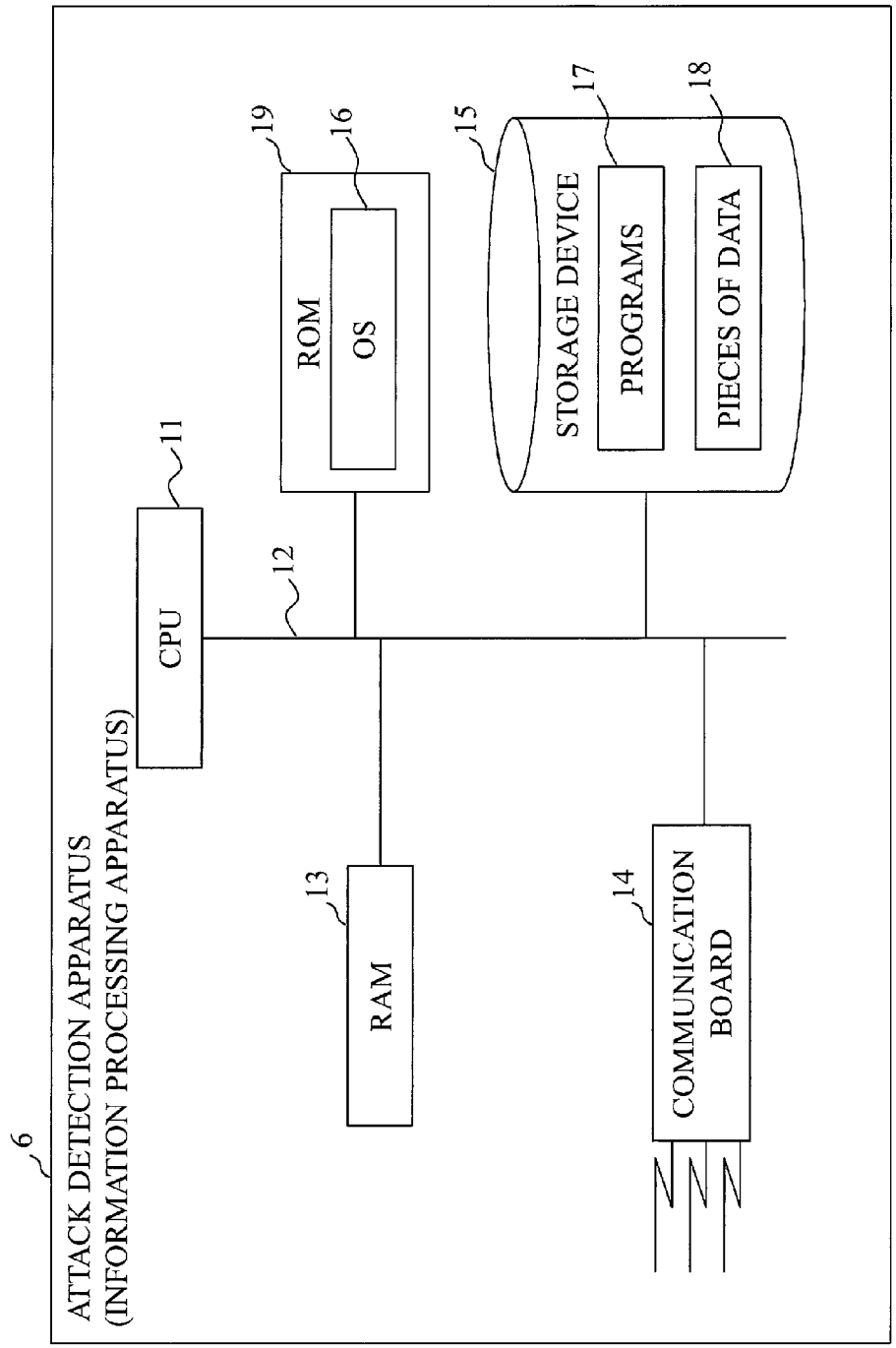
FIG. 4 is a diagram illustrating another hardware configuration example of the attack detection apparatus according to the first embodiment.

FIG. 4 is a diagram illustrating another example of hardware resources of the attack detection apparatus 6.

In a hardware configuration of FIG. 4, a ROM (Read Only Memory) 19 is added in comparison with a configuration of FIG. 3.

Then, the ROM 19 stores the OS 16.

Figure 5:
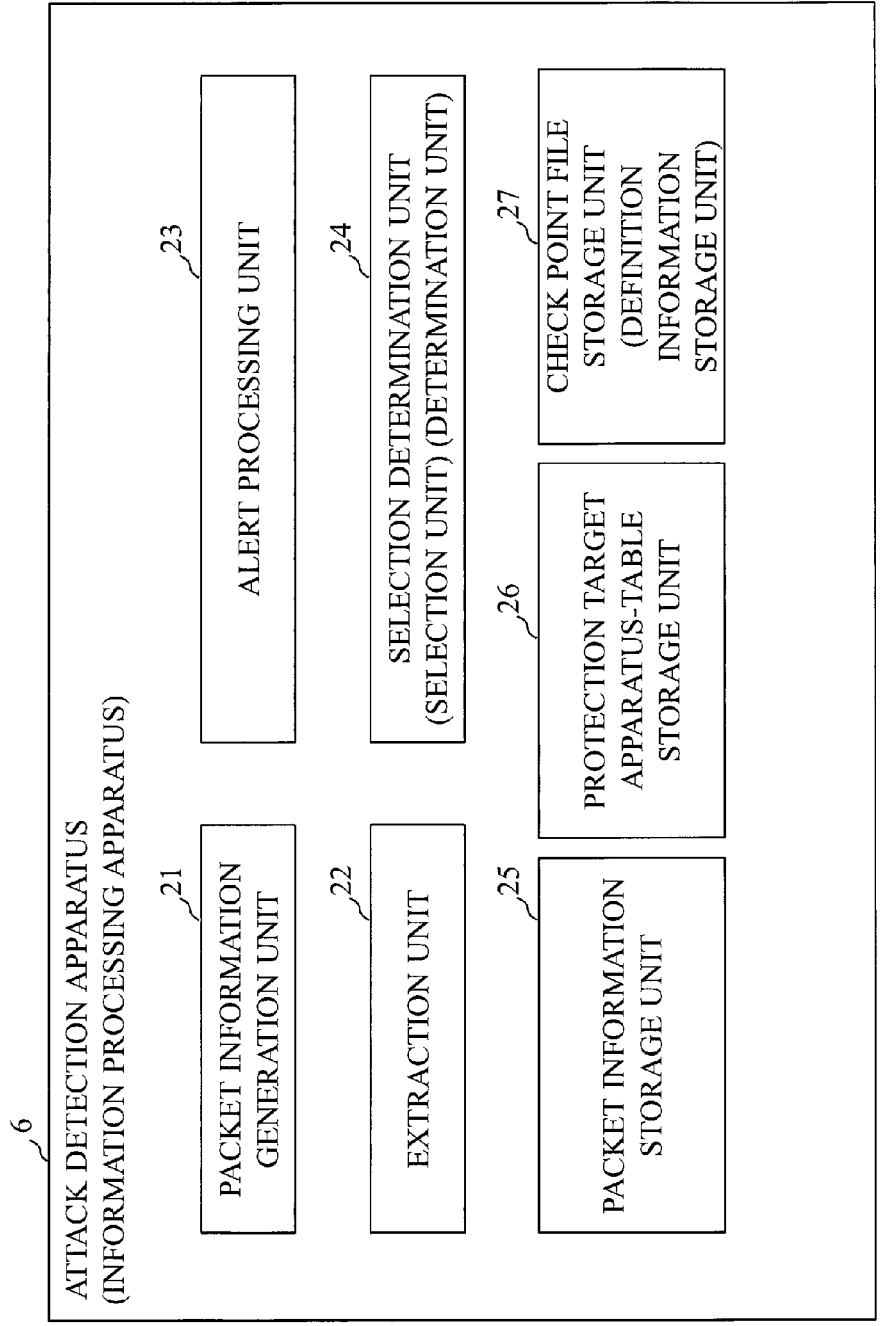
FIG. 5 is a diagram illustrating a function configuration example of the attack detection apparatus according to the first embodiment.

FIG. 5 illustrates a function configuration example of the attack detection apparatus 6 according to the present embodiment.

A packet information generation unit 21 generates packet information.

The packet information is information in which an entry is set for each packet received from the network apparatus 3 and attribute data of the packet is described together with the occurrence time of the packet in each entry.

The packet information is, for example, information illustrated in FIG. 7.

The details of the packet information will be described below with reference to FIG. 7.

Every time when the packet information generation unit 21 receives a packet from the network apparatus 3, the packet information generation unit 21 creates an entry of the received packet and updates a packet information 250.

A check point file storage unit 27 stores a check point file.

In the check point file, a plurality of categories of attack (attack types) is indicated, and an extraction time width and an extraction condition are defined for each category (attack type).

The check point file is, for example, information illustrated in FIG. 9.

The details of the check point file will be described below with reference to FIG. 9.

Note that, the check point file is an example of definition information, and the check point file storage unit 27 corresponds to an example of a definition information storage unit.

When the suspicious packet is detected by the security apparatus 4, an extraction unit 22 extracts a certain entry from the packet information based on an extraction time width (check time period) and an extraction condition (a transmission source IP address, a transmission source port number, a transmission destination IP address, a transmission destination port number, and a size) defined in the check point file.

When the suspicious packet is detected by the security apparatus 4, a selection determination unit 24 selects the extraction time width and the extraction condition that are used by the extraction unit 22.

Further, the selection determination unit 24 determines the presence or absence of the attack to the protection target apparatus 5 by applying a determination criterion described in the check point file to an extraction result of the extraction unit 22.

The selection determination unit 24 corresponds to examples of a selection unit and a determination unit.

When the attack to the protection target apparatus 5 is detected by the selection determination unit 24, an alert processing unit 23 outputs the alert to notify the monitoring apparatus 7 of the detection of the attack.

A packet information storage unit 25 stores the packet information generated by the packet information generation unit 21.

A protection target apparatus-table storage unit 26 stores a protection target apparatus-table.

The protection target apparatus-table is a table in which an attribute of the protection target apparatus is described. For example, the protection target apparatus-table is information illustrated in FIG. 8.

The details of the protection target apparatus-table will be described below with reference to FIG. 8.

Figure 6:
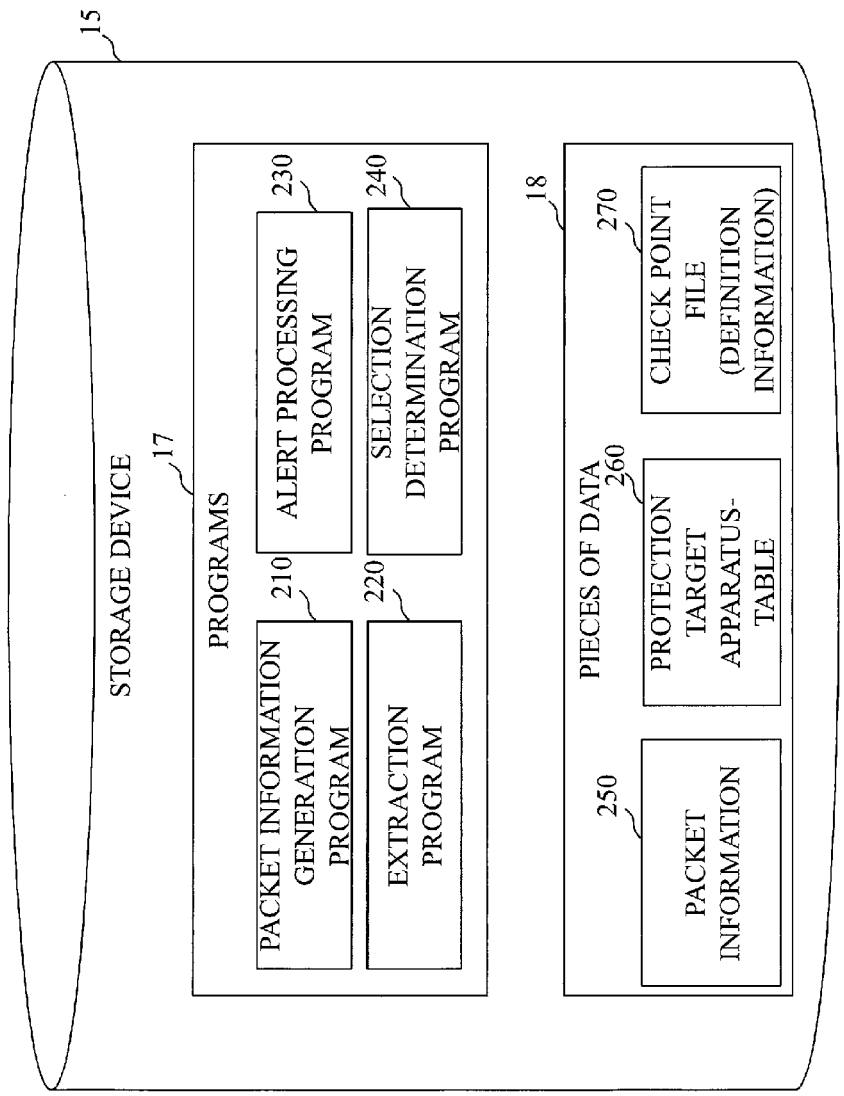
FIG. 6 is a diagram illustrating an example of programs and pieces of data in a storage device of the attack detection apparatus according to the first embodiment.

FIG. 6 illustrates the contents stored in the storage device 15.

The storage device 15 stores the programs 17 and the pieces of data 18.

The programs 17 store a packet information generation program 210, an extraction program 220, an alert processing program 230, and a selection determination program 240.

The packet information generation program 210 is a program to realize the packet information generation unit 21.

That is, the CPU 11 executes the packet information generation program 210 so that the packet information generation unit 21 is realized.

The extraction program 220 is a program to realize the extraction unit 22.

That is, the CPU 11 executes the extraction program 220 so that the extraction unit 22 is realized.

The alert processing program 230 is a program to realize the alert processing unit 23.

That is, the CPU 11 executes the alert processing program 230 so that the alert processing unit 23 is realized.

The selection determination program 240 is a program to realize the selection determination unit 24.

That is, the CPU 11 executes the selection determination program 240 so that the selection determination unit 24 is realized.

The pieces of data 18 store the packet information 250, a protection target apparatus-table 260, and a check point file 270.

That is, an area in the storage device 15 where the pieces of data 18 is stored corresponds to the packet information storage unit 25, the protection target apparatus-table storage unit 26, and the check point file storage unit 27.

FIG. 7 illustrates an example of the packet information 250.

The packet information 250 stores a number 31 assigned to the packet, an occurrence time 32 of the packet, a transmission source IP address 33, a transmission source port number 34, a transmission destination IP address 35, a transmission destination port number 36, a protocol 37, a length 38 of the packet, and any other information 39.

The occurrence time 32 of the packet is a time when the packet is transmitted from the transmission source.

FIG. 8 illustrates an example of the protection target apparatus-table 260.

In the protection target apparatus-table 260 of FIG. 8, attributes of the plurality of protection target apparatuses 5 are described.

In the protection target apparatus-table 260, a number 41 assigned to the protection target apparatus 5, an IP address 42 of the protection target apparatus 5, a classification 43 of the protection target apparatus 5, a usage 44, and a port number 45 allowed for a communication with the outside, are described.

FIG. 9 is an example of the check point file 270.

In the check point file 270, a signature ID 51, an attack type 52, a transmission source IP address 53, a transmission source port number 54, a transmission destination IP address 55, a transmission destination port number 56, a check time period 57, a size 58, and a determination criterion 59, are described.

The signature ID 51 is an ID of a signature for attack detection stored in the security apparatus 4, and FIG. 9 illustrates an example of the signature ID.

The attack type 52 is a classification of the signature for attack detection stored in the security apparatus 4, and FIG. 9 illustrates an example of the attack type 52.

In other words, the attack type 52 represents a category of attack detected by a signature identified by the signature ID.

For example, an Exploit type of attack can be detected by the signature whose signature ID is 1.

In FIG. 9, "Any" indicates that nothing is particularly specified.

"$SRC_ADDR" indicates the transmission source IP address of the packet which has caused the alert.

"$SRC_PORT" indicates the transmission source port number of the packet which has caused the alert.

"$DST_ADDR" indicates the transmission destination IP address of the packet which has caused the alert.

"$DST_PORT" indicates the transmission destination port number of the packet which has caused the alert.

When there are some numbers, they are listed in [ ] and separated by ",".

When a number indicates other than a specified number, it is prefixed with "~".

The transmission source IP address 53 indicates a transmission source IP address of the packet being an extraction target.

The transmission source port number 54 indicates a transmission source port number of the packet being the extraction target.

The transmission destination IP address 55 indicates a transmission destination IP address of the packet being the extraction target.

The transmission destination port number 56 indicates a transmission destination port number of the packet being the extraction target.

The check time period 57 indicates applying directions of the extraction time width and the extraction time width.

In other words, numerical values of the check time period 57 represent extraction time widths (in seconds), and positions of the numerical values partitioned by ":" represent the applying directions.

A numerical value before ":" indicates the extraction time width in seconds which extends backward from the occurrence time of the suspicious packet, and a numerical value after ":" indicates the extraction time width in seconds which extends forward from the occurrence time of the suspicious packet.

For example, "600:600" specifies a time period from a time which is 600 seconds before the occurrence time of the suspicious packet, to a time which is 600 seconds after the occurrence time of the suspicious packet.

The size 58 indicates a size of the packet to be extracted.

It is indicated that the packet whose size coincides with a numerical value is to be extracted when the size 58 is the numerical value, the packet of any size is to be extracted when the size 58 is "Any", and the packet whose size is the same is to be extracted when the size 58 is "Same".

When the size 58 is the numerical value, a range is specified by inserting inequality signs, which are <, ≤, >, and ≥, before the numerical value.

The determination criterion 59 indicates the number of extracted packets, a total size of the extracted packets, and a determination condition relating to a logical operation of them, by separating by ",".

As the number of the packets, "Any" indicates that a condition is not particularly specified, "≥m" (m is a positive integer) indicates that there are greater than or equal to mpackets, and "≤n" (n is a positive integer) indicates that there are less than or equal to npackets.

"+x %" (x is a positive integer) indicates that the number of the packets is increased by x % before and after the occurrence time of the suspicious packet.

"−y %" (y is an integer from 1 to 100) indicates that the number of the packets is decreased by y % before and after the occurrence time of the suspicious packet.

As the total size of the packets, "Any" indicates that a condition is not particularly specified, "≥m" (m is a positive integer) indicates that the total size is greater than or equal to m, and "≤n" (n is a positive integer) indicates that the total size is less than or equal to n.

"+x %" (x is a positive integer) indicates that the total size of the packets is increased by x % before and after the occurrence time of the suspicious packet.

"−y %" (y is an integer from 1 to 100) indicates that the total size of the packets is decreased by y % before and after the occurrence time of the suspicious packet.

The logical operation is AND or OR. AND indicates that both of the number and the total size of the packets needs to satisfy its condition, and OR indicates that either one of them needs to satisfy its condition.

If an attacker succeeds to enter the protection target apparatus 5, a communication from the attacker to a port of the protection target apparatus 5 is operated to upload a file for establishing a basis. Thus, an increase in a communication amount is expected to be observed.

In the entry (the attack type 52: Exploit) of the first row, from this point of view, it is defined as the determination criterion 59 that the total size of the packets the transmission destination IP address of which is "$DST_ADDR" and the transmission destination port number of which is "$DST_PORT" is increased by 30%.

Further, if there is a communication between a site registered in a black list and the protection target apparatus 5, the communication is periodically operated for a remote control. Thus, many external communications of packets whose sizes are the same are expected to be observed.

In the entry (the attack type 52: Blacklist) of the second row, from this point of view, it is defined as the determination criterion 59 that the number of the packets the transmission source IP address of which is "$SRC_ADDR" and the transmission destination port number of which is [80, 443] is greater than or equal to 100.

Further, if a malware is detected, an unapproved communication from the protection target apparatus 5 to the outside is expected to be observed.

In the entry (the attack type 52: Malware) of the third row, from this point of view, it is defined as the determination criterion 59 that there is one or more packets the transmission source IP address of which is "$DST_ADDR" and the transmission source port number of which is "~[80, 443]".

The selection determination unit 24 reads out the check point file 270 and selects the check time period 57 described in the entry in which the signature ID of the signature is described, the signature being used in the security apparatus 4 for the detection of the suspicious packet.

Further, the selection determination unit 24 selects the transmission source IP address 53, the transmission source port number 54, the transmission destination IP address 55, the transmission destination port number 56, and the size 58, which are described in the entry.

The check time period 57 selected by the selection determination unit 24 corresponds to an example of a selection extraction time width. The transmission source IP address 53, the transmission source port number 54, the transmission destination IP address 55, the transmission destination port number 56, and the size 58, which are selected by the extraction unit 22, correspond to examples of selection extraction condition.

Further, the selection determination unit 24 specifies an extraction time range which starts from the occurrence time of the detected suspicious packet and whose width is equal to the check time period 57.

Next, the extraction unit 22 extracts from the packet information 250 (FIG. 7) the entry where the time 32 is included in the extraction time range, and the attribute data (the transmission source IP address 33, the transmission source port number 34, the transmission destination IP address 35, the transmission destination port number 36, and the length 38) coincides with the selected extraction condition (the transmission source IP address 53, the transmission source port number 54, the transmission destination IP address 55, the transmission destination port number 56, and the size 58).

After that, the selection determination unit 24 collates the number of entries (the number of the packets) extracted by the extraction unit 22 and the total size of the entries which is the total of each size described in each entry extracted by the extraction unit 22, with the determination criterion 59. When they coincide with the determination criterion 59, the selection determination unit 24 determines that the protection target apparatus 5 has been attacked by the suspicious packet.

Next, a data flow will be described.

Figure 10:
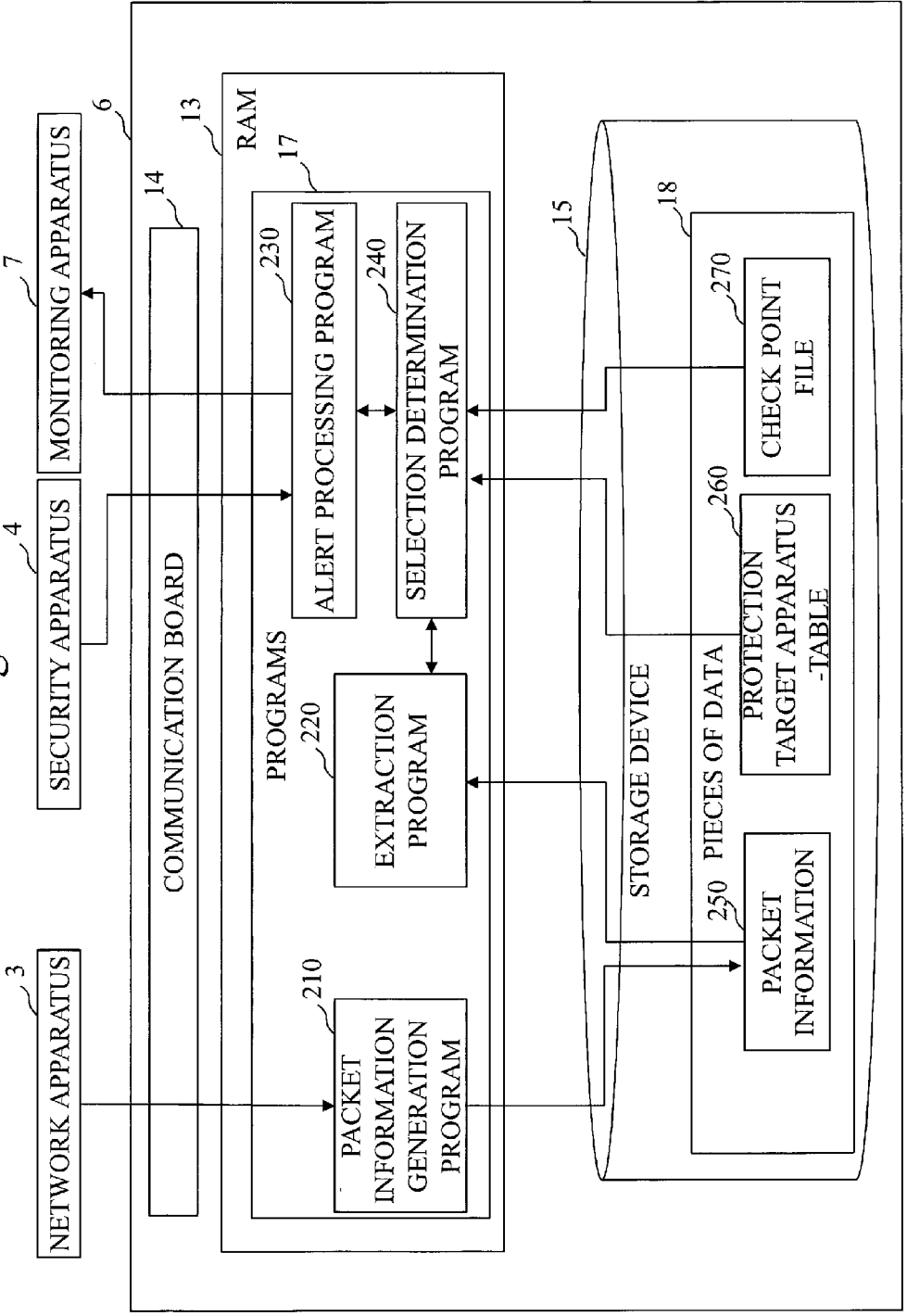
FIG. 10 is a diagram illustrating a data flow in the attack detection system according to the first embodiment.

FIG. 10 is a diagram logically illustrating main data flow in the attack detection system 1.

FIG. 10 is illustrated based on FIG. 6.

Further, FIG. 10 illustrates that each program of the programs 17 is in a state of being loaded onto the RAM 13 from the storage device 15.

An instruction of each program is read by the CPU 11 through the bus 12 and then executed by the CPU 11. Since this operation is obvious for those who are familiar with a computer, descriptions regarding the CPU 11 and the bus 12 are omitted in the following description.

In other words, an operation realized by executing the packet information generation program 210 by the CPU 11 will be described below as an operation of the packet information generation unit 21.

Similarly, an operation realized by executing the extraction program 220 by the CPU 11 will be described as an operation of the extraction unit 22.

Similarly, an operation realized by executing the selection determination program 240 by the CPU 11 will be described as an operation of the selection determination unit 24.

Similarly, an operation realized by executing the alert processing program 230 by the CPU 11 will be described as an operation of the alert processing unit 23.

In accordance with the set-up, the network apparatus 3 transmits to the attack detection apparatus 6 a packet communicated between the external network 2 and the protection target apparatus 5.

The packet information generation unit 21 of the attack detection apparatus 6 receives this packet through the communication board 14 and adds the entry of the received packet to the packet information 250.

In the entry, as illustrated in FIG. 7, attribute data (a time, a transmission source IP address, a transmission source port number, a transmission destination IP address, a transmission source port number, a protocol, a length, and any other information) of the received packet is described.

Every time when the packet information generation unit 21 receives a packet from the network apparatus 3, the packet information generation unit 21 generates an entry of the received packet.

The packet information 250 is stored in the packet information storage unit 25 on the storage device 15.

Further, when the security apparatus 4 detects the suspicious packet including the signature (the attack type), the security apparatus 4 transmits the alert to the attack detection apparatus 6.

In other words, when the security apparatus 4 detects the suspicious packet corresponding to any attack type 52 in the check point file 270 (FIG. 9), the security apparatus 4 transmits the alert notifying of the detected suspicious packet to the attack detection apparatus 6.

In the alert, the signature ID; the occurrence time; and the transmission source IP address, the transmission source port number, the transmission destination IP address, and transmission destination port number of the suspicious packet; are included.

The alert processing unit 23 of the attack detection apparatus 6 receives this alert through the communication board 14 and records the alert temporally.

Then, the alert processing unit 23 outputs a check request including the signature ID; the occurrence time; and the transmission source IP address, the transmission source port number, the transmission destination IP address, and the transmission destination port number of the suspicious packet; which are included in the alert, to the selection determination unit 24.

The selection determination unit 24 reads out from the storage device 15 the entry (also referred to as the check point) corresponding to the signature ID in the check point file 270.

Further, the selection determination unit 24 selects the check time period 57 indicated in the read out entry (the check point) as the extraction time width to be used by the extraction unit 22.

Further, the selection determination unit 24 selects the transmission source IP address 53, the transmission source port number 54, the transmission destination IP address 55, the transmission destination port number 56, and the size 58 indicated in the read out entry as the extraction condition to be used by the extraction unit 22.

Furthermore, the selection determination unit 24 specifies a time range being equal to the extraction time width, starting from the occurrence time of the suspicious packet, as the extraction time range.

Then, the selection determination unit 24 outputs to the extraction unit 22 an extraction request including the extraction time range, the extraction condition, and the check request from the alert processing unit 23.

In accordance with a packet acquisition request from the selection determination unit 24, the extraction program 220 extracts the corresponding entry from the packet information 250 in the storage device 15 and returns the extraction result to the selection determination unit 24.

The selection determination unit 24 analyzes the extraction result received from the extraction unit 22 in accordance with the determination criterion 59 in the check point file 270, determines the presence or absence of the attack, and returns a determination result to the alert processing unit 23.

In accordance with the determination result of the selection determination unit 24, the alert processing unit 23 discards the alert or transmits the alert to the monitoring apparatus 7.

Nextly, with reference to flowcharts, an operation example of the attack detection apparatus 6 will be described.

Figure 11:
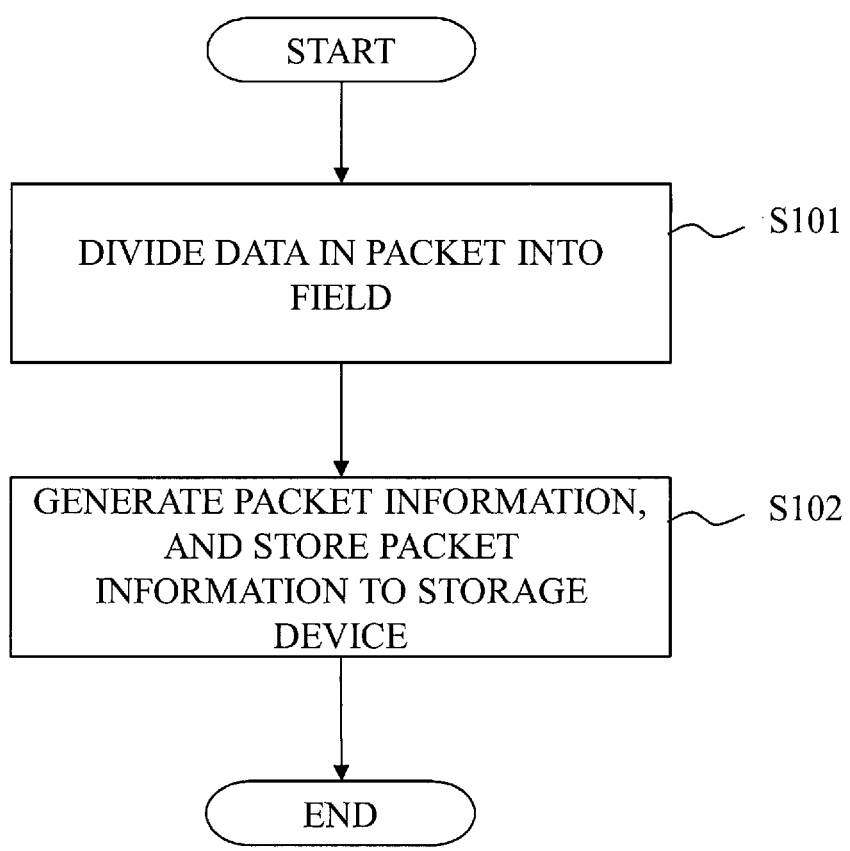
FIG. 11 is a flowchart diagram illustrating an operation example of a packet information generation unit according to the first embodiment.

FIG. 11 is a flowchart illustrating an operation example of the packet information generation unit 21.

The packet information generation unit 21 is started when the communication board 14 receives the packet transmitted from the network apparatus 3.

The packet information generation unit 21 divides the received packet into each data field of the packet information 250 (step S101).

Nextly, the packet information generation unit 21 generates a new entry of the packet information 250 from the received packet, adds the new entry to the packet information 250, and stores in the storage device 15 the packet information 250 to which the new entry is added, (step S102).

Figure 12:
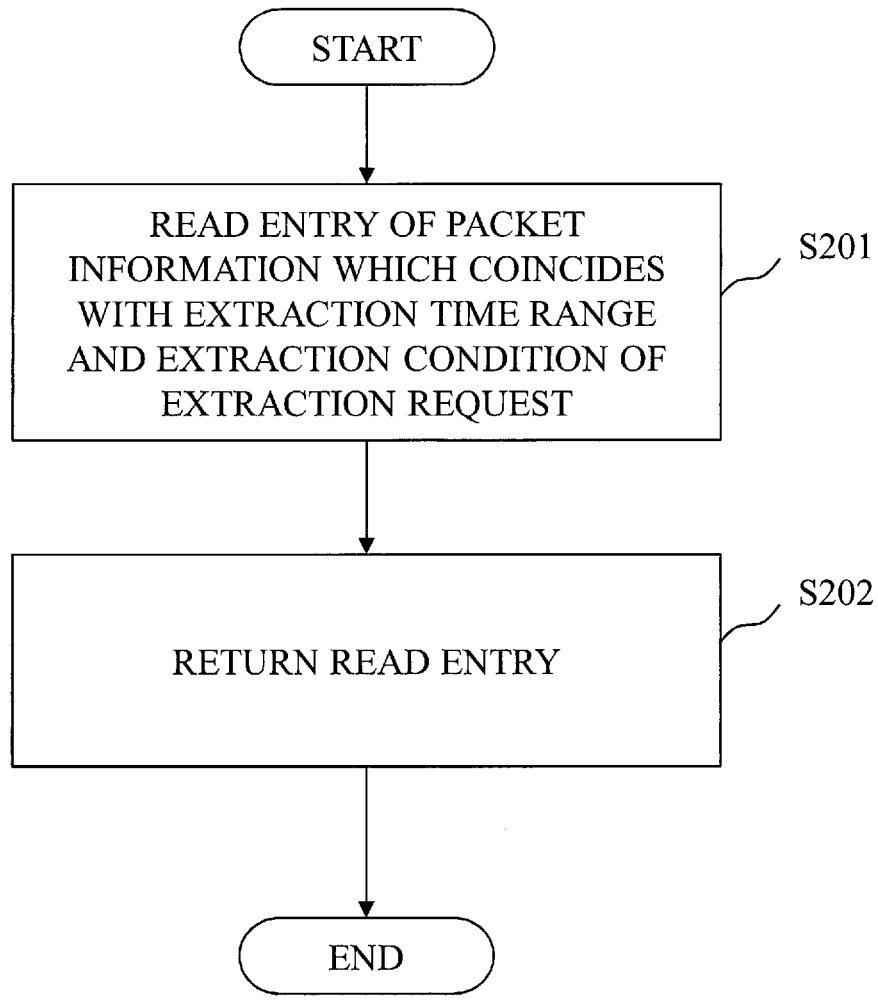
FIG. 12 is a flowchart diagram illustrating an operation example of an extraction unit according to the first embodiment.

FIG. 12 is a flowchart illustrating an operation example of the extraction unit 22.

The extraction unit 22 is started when the extraction request is output from the selection determination unit 24.

The extraction unit 22 reads from the storage device 15 the entry of the packet information 250 which coincides with the extraction time range and the extraction condition of the extraction request (step S201).

Then, the extraction unit 22 returns the read entry to the selection determination unit 24 (step S202).

Figure 13:
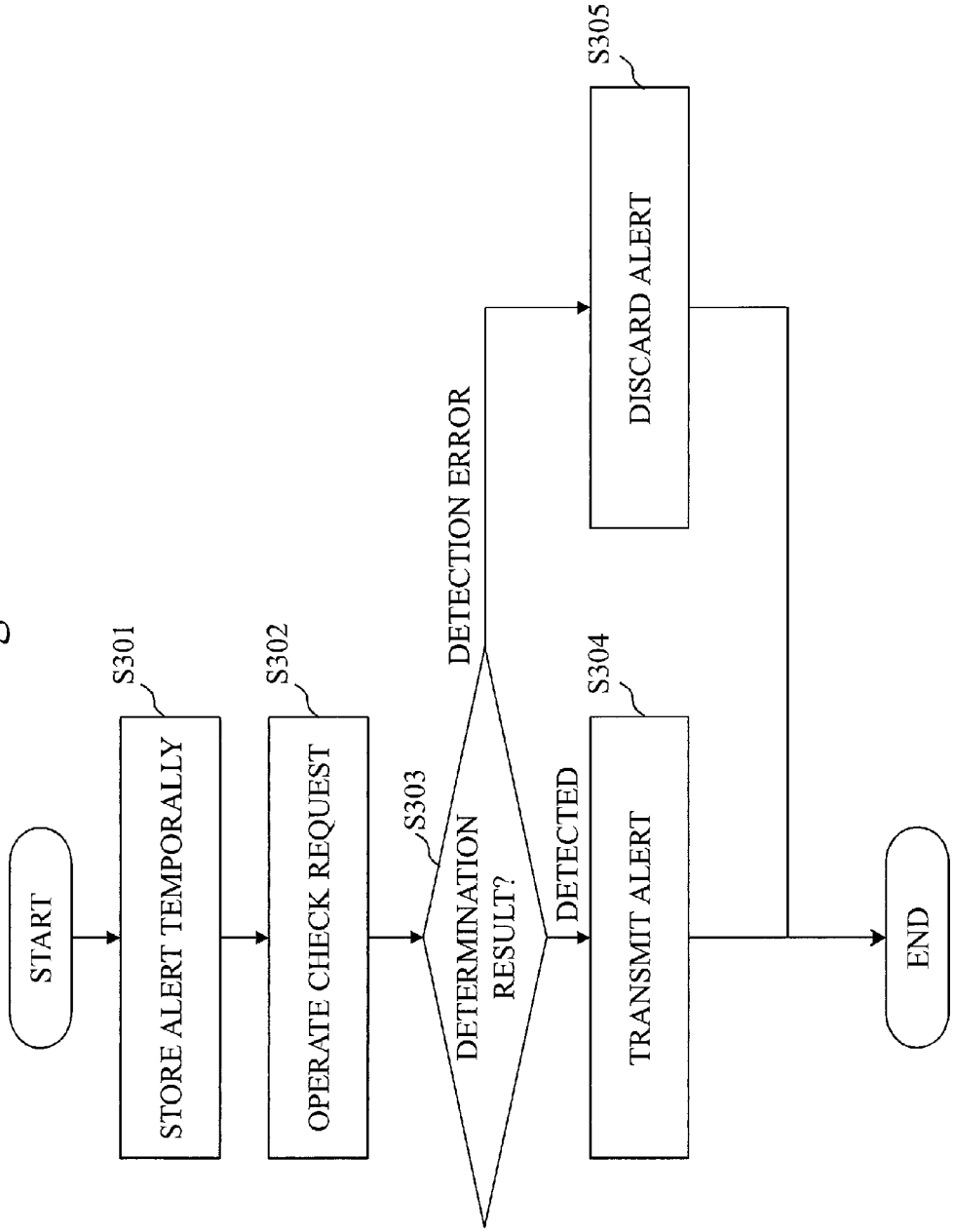
FIG. 13 is a flowchart diagram illustrating an operation example of an alert processing unit according to the first embodiment.

FIG. 13 is a flowchart illustrating an operation example of the alert processing unit 23.

The alert processing unit 23 is started when the communication board 14 received the alert from the security apparatus 4.

The alert processing unit 23 stores the received alert temporally on the RAM 13 (step S301).

Nextly, the alert processing unit 23 outputs to the selection determination unit 24 the check request including the signature ID, the occurrence time, the transmission source IP address, the transmission source port number, the transmission destination IP address, and the transmission destination port number, which are included in the alert (step S302).

Nextly, the alert processing unit 23 checks the determination result included in a response from the selection determination unit 24 (step S303).

When the determination result is a "detection error", the alert processing unit 23 discards the alert temporally stored on the RAM 13 in the step S301 (step S304).

When the determination result is an "attack detected", the alert processing unit 23 transmits to the monitoring apparatus 7 the alert temporally stored on the RAM 13 in the step S301 (step S305).

Figure 14:
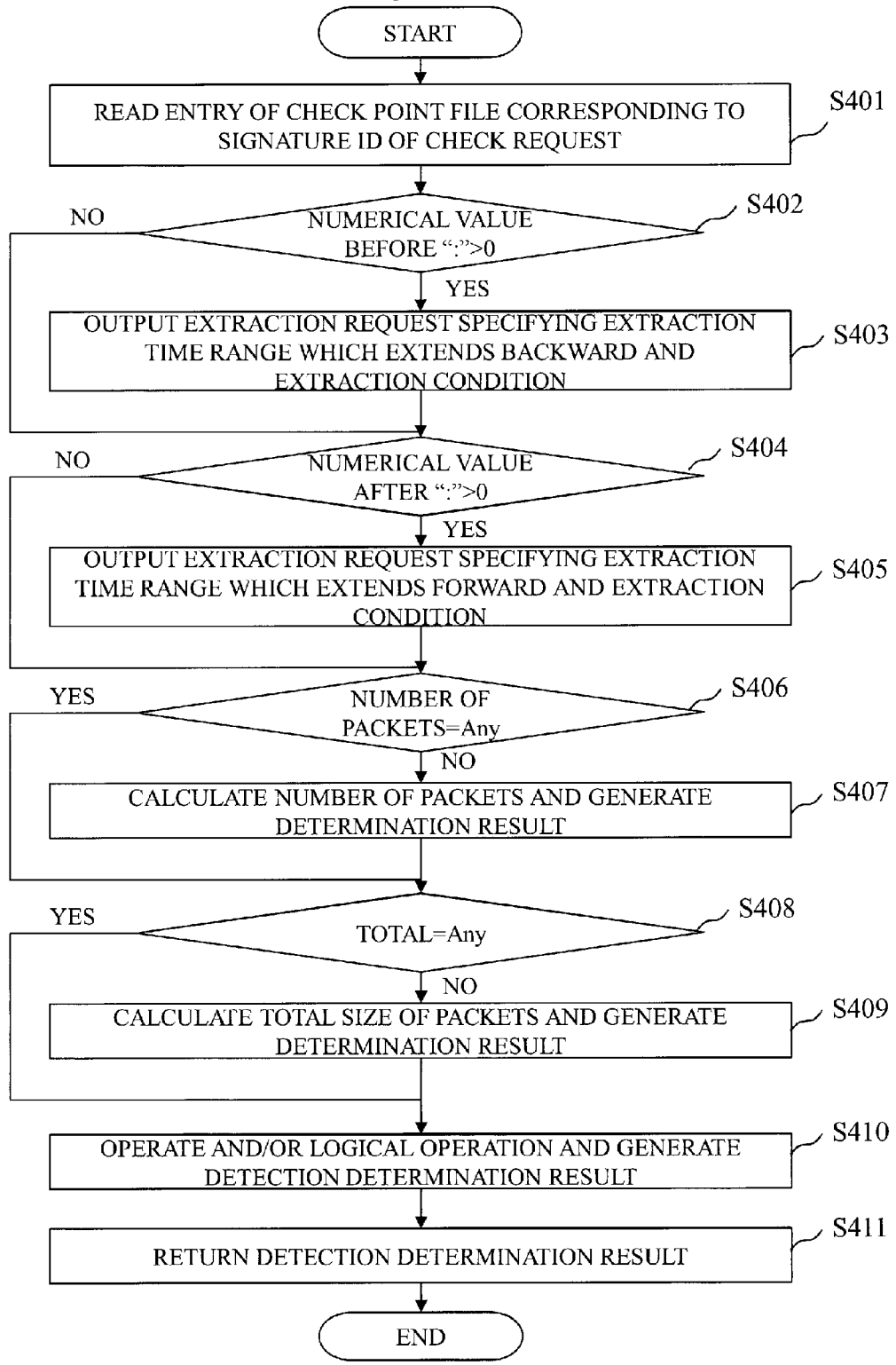
FIG. 14 is a flowchart diagram illustrating an operation example of a determination unit according to the first embodiment.

FIG. 14 is a flowchart illustrating an operation example of the selection determination unit 24.

The selection determination unit 24 is started when the check request is output from the alert processing unit 23.

The selection determination unit 24 reads from the storage device 15 the entry (the check point) corresponding to the signature ID of the check request in the check point file 270 (step S401).

The selection determination unit 24 checks whether the numerical value before ":" of the check time period 57 in the check point is greater than 0 (step S402).

When the numerical value before ":" of the check time period 57 in the check point is greater than 0, the selection determination unit 24 specifies, as the extraction time range, a time period from a time obtained by subtracting the numerical value before ":" in seconds from the occurrence time of the suspicious packet, to the occurrence time.

Further, the selection determination unit 24 specifies, as the extraction condition, the transmission source IP address, the transmission source port number, the transmission destination IP address, and the transmission source port number described in the check point.

Then, the selection determination unit 24 outputs to the extraction unit 22 the extraction request including the extraction time range, the extraction condition, and the check request (step S403).

When the numerical value before ":" of the check time period 57 in the check point is 0, the selection determination unit 24 executes the step S405.

Nextly, the selection determination unit 24 checks whether the numerical value after ":" of the check time period 57 in the check point is greater than 0 (step S404).

When the numerical value after ":" of the check time period 57 in the check point is greater than 0, the selection determination unit 24 specifies, as the extraction time range, a time period from the occurrence time of the suspicious packet to a time obtained by adding the numerical value after ":" in seconds to the occurrence time.

Further, the selection determination unit 24 specifies, as the extraction condition, the transmission source IP address, the transmission source port number, the transmission destination IP address, and the transmission destination port number described in the check point.

Then, the selection determination unit 24 outputs to the extraction unit 22 the extraction request including the extraction time range, the extraction condition, and the check request (step S405).

Note that, when the numerical values before and after ":" of the check time period 57 in the check point are greater than 0, the step S403 may be omitted. Then in the step S405, a time period from the time obtained by subtracting the numerical value before ":" in seconds from the occurrence time of the suspicious packet, to the time obtained by adding the numerical value after ":" in seconds to the occurrence time of the suspicious packet, may be specified as the extraction time range, and the transmission source IP address, the transmission source port number, the transmission destination IP address, and the transmission destination port number described in the check point may be specified as the extraction condition.

When the extraction result is obtained from the extraction unit 22, the selection determination unit 24 checks whether "Any" is described in the number of the packets of the determination criterion 59 in the check point (step S406).

When the number of the packets is not "Any", based on the number of the entries acquired from the extraction unit 22, the selection determination unit 24 generates the determination result with respect to the number of the packets (step S407).

Nextly, the selection determination unit 24 checks whether "Any" is described in the total size of the packets of the determination criterion 59 in the check point (step S408).

When the total size of the packets is not "Any", based on the accumulation of the "length" described in the entry acquired from the extraction unit 22, the selection determination unit 24 generates the determination result with respect to the total size of the packets (step S409).

In the step S406, when "Any" is specified in the number of the packets of the determination criterion 59 in the check point, the selection determination unit 24 executes the step S408.

In the step S408, when "Any" is specified in the total size of the packets of the determination criterion 59 in the check point, the selection determination unit 24 executes the step S410.

Nextly, in accordance with the logical operation of the determination criterion 59, the selection determination unit 24 generates a detection determination result depending on the determination result of the number of the packets and the determination result of the total size of the packets (step S410).

Nextly, the selection determination unit 24 responds with the detection determination result generated in the step S410 to the alert processing unit 23 (step S411).

Nextly, the operation example of the attack detection apparatus 6 according to the present embodiment will be described with a specific example.

In the following, it is assumed that the packet information 250 illustrated in FIG. 7 is stored in the storage device 15.

When the suspicious packet is detected in the security apparatus 4, the alert processing unit 23 outputs to the selection determination unit 24 the check request including the signature ID, the occurrence time, the transmission source IP address, the transmission source port number, the transmission destination IP address, and the transmission destination port number included in the alert.

Here, it is assumed that the contents included in the check request are as follows:
signature ID: 1
occurrence time: 2014.6.28.13:36:15.0001
transmission source IP address: 10.0.0.100
transmission source port number: 51355
transmission destination IP address: 192.168.1.10
transmission destination port number: 80

The selection determination unit 24 reads out the entry of the signature ID: 1 as a check point from the check point file 270.

In the check time period 57 in the check point, "600:600" is described. Thus, the selection determination unit 24 specifies a time period from "2014.6.28.13:26:15.0001" to "2014.6.28.13:46:15.0001" as the extraction time width.

Nextly, the selection determination unit 24 specifies, as the extraction condition, "Any", "Any", "$DST_ADDR" "$DST_PORT", and "Any" described in the transmission source IP address 53, the transmission source port number 54, the transmission destination IP address 55, the transmission destination port number 56, and the size 58 in the check point.

Then, the selection determination unit 24 outputs to the extraction unit 22 the extraction request including the extraction time width, the extraction condition, and the check request from the alert processing unit 23.

In accordance with the extraction request, the extraction unit 22 searches for the packet information 250.

Specifically, the extraction unit 22 extracts from the packet information 250 an entry which coincides with the extraction condition and a time described in the time 32 of which is included in a range between "2014.6.28.13:26:15.0001" and "2014.6.28.13:46:15.0001", the range being the extraction time width.

For example, in the first row of FIG. 7, the time described in the time 32 is included in the extraction time width.

Further, the transmission destination IP address in the first row of FIG. 7 is "192.168.1.10" and coincides with "$DST_ADDR" which is the extraction condition of the transmission destination IP address. The transmission destination port number is "80" and coincides with "$DST_PORT" which is the extraction condition of the transmission destination port number.

Further, the extraction condition of the transmission source IP address, the extraction condition of the transmission source port number, and the extraction condition of the size are "Any".

Accordingly, the extraction unit 22 extracts the entry in the first row of FIG. 7.

The extraction unit 22 operates the same collation for the entry the time described in the time 32 of which is included in the extraction time width, and the extraction unit 22 outputs the extracted entry to the selection determination unit 24.

The selection determination unit 24 compares the extraction result from the extraction unit 22 with the determination criterion 59 in the check point.

The determination criterion 59 in the check point is "Any, +30%, AND".

Since the determination criterion of the number of the packets is "Any", the selection determination unit 24 does not operate the step S407 of FIG. 14.

On the other hand, since the determination criterion of the total size of the packets is "+30%", the selection determination unit 24 operates the S409 of FIG. 14.

In other words, based on the size described in the column of the length 38 of the entry output from the extraction unit 22, the selection determination unit 24 calculates the total size before the occurrence time of the suspicious packet and the total size after the occurrence time of the suspicious packet.

Then, when the total size after the occurrence time is greater than the total size before the occurrence time by 30% or more, the selection determination unit 24 determines that the attack to the protection target apparatus 5 is occurring by the suspicious packet.

As described above, according to the present embodiment, the presence or absence of the attack to the protection target apparatus can be determined without providing a verification network.

Further, in the present embodiment, depending on the attack type of the packet which is detected by the security apparatus based on the signature, the security apparatus analyses a packet whose occurrence time is before the occurrence time of the packet, a packet whose occurrence time is after the occurrence time of the packet, or the packet whose occurrence time is before the occurrence time of the packet and the packet whose occurrence time is after the occurrence time of the packet.

Accordingly, detection leakage or a detection error caused by using the verification network can be avoided.

Note that, in the present embodiment, when the determination result is the "detection error", the alert processing unit 23 discards the alert. However, without discarding the alert, it is also possible to transmit the alert to the monitoring apparatus 7 after setting the level of the alert to "low" (or "1").

Second Embodiment

In the above first embodiment, the check point file 270 is created by using an editor or the like by a system manager. Nextly, in the present embodiment, the check point file 270 is created by using a tool.

A difference from the first embodiment will be described below.

Matters not described below are the same as those described in the first embodiment.

Figure 15:
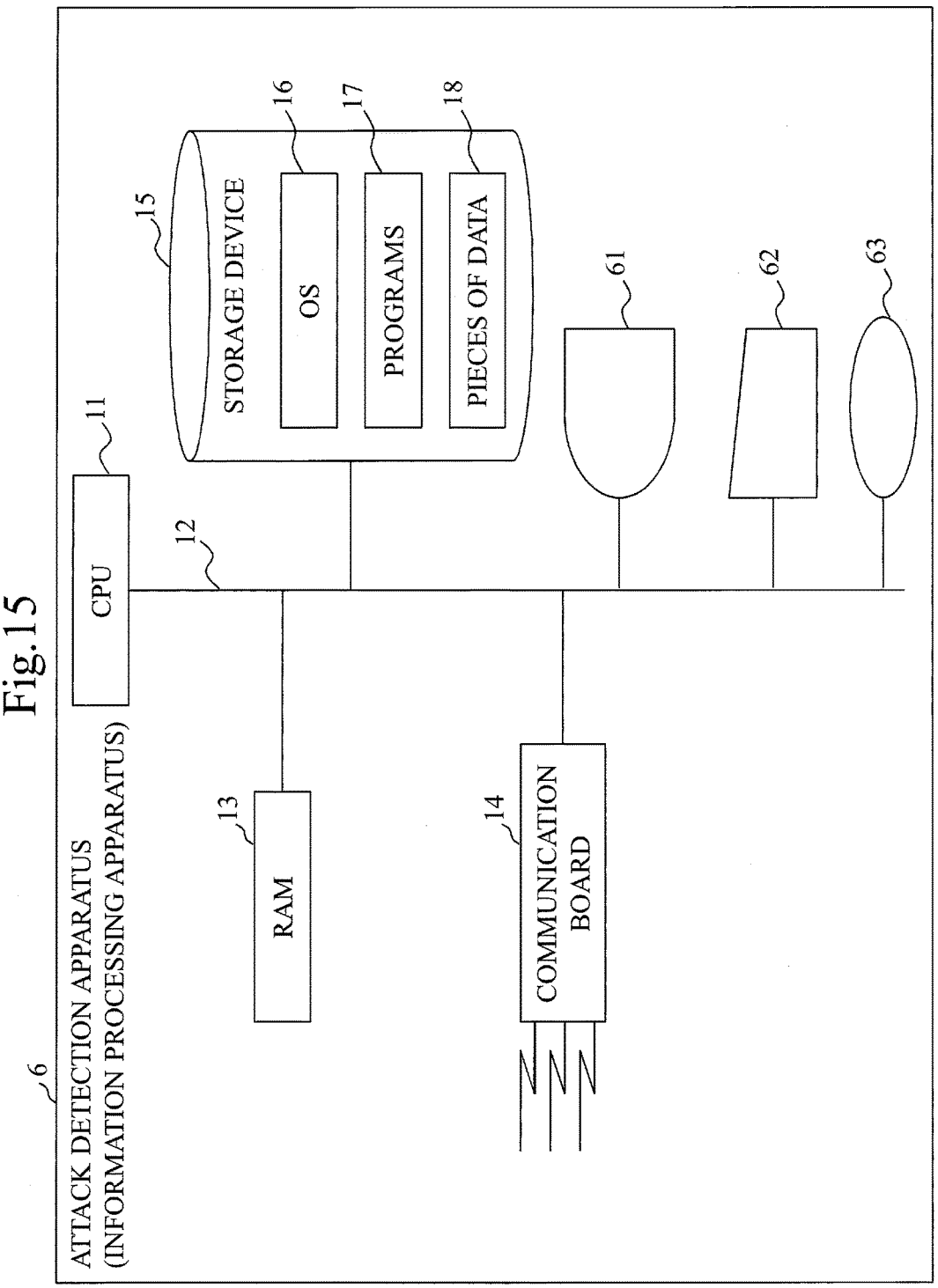
FIG. 15 is a diagram illustrating a hardware configuration example of the attack detection apparatus according to a second embodiment.

FIG. 15 is a diagram illustrating an example of hardware resources of the attack detection apparatus 6 according to the present embodiment.

In FIG. 15, a display 61, a keyboard 62, and a mouse 63 are added in comparison with the hardware resources in FIG. 3.

Figure 16:
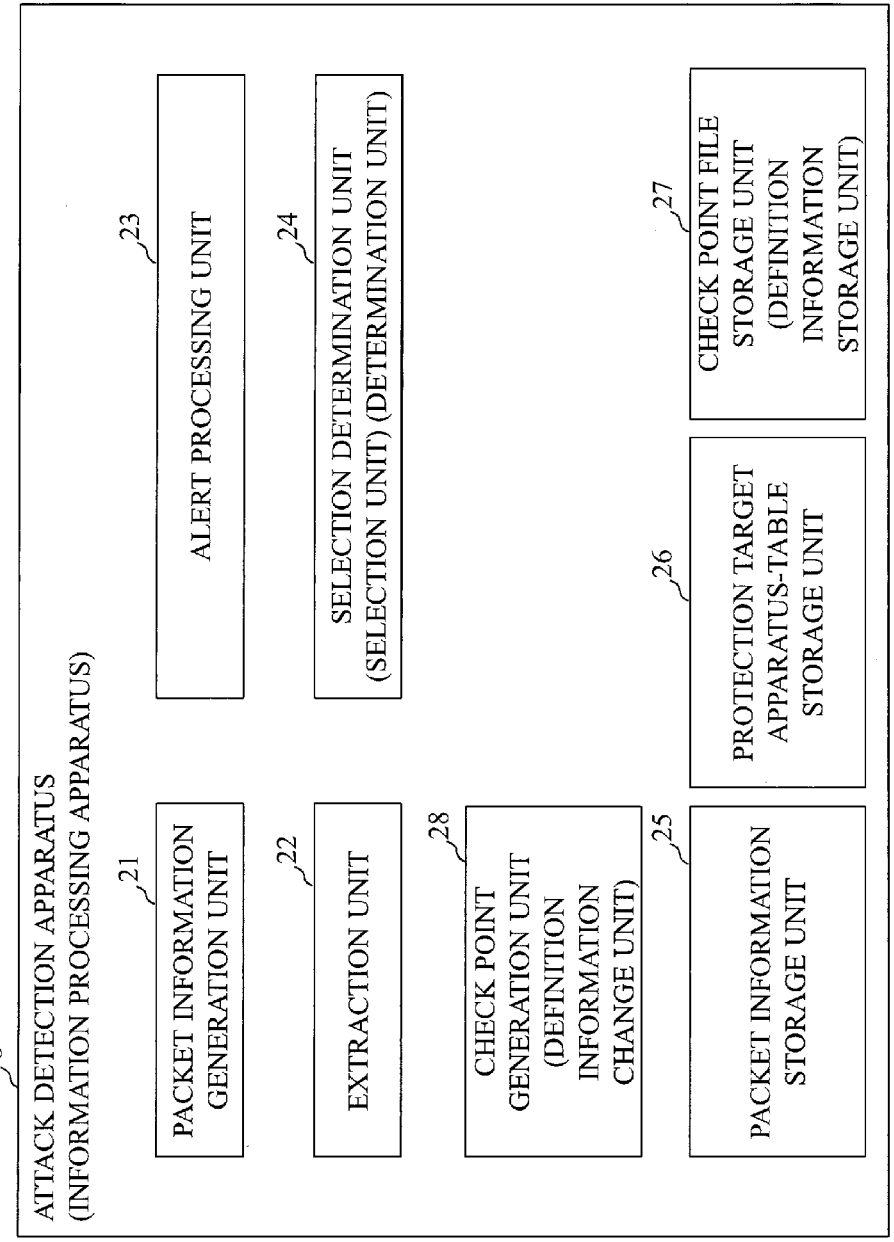
FIG. 16 is a diagram illustrating a function configuration example of the attack detection apparatus according to the second embodiment.

FIG. 16 illustrates a function configuration example of the attack detection apparatus 6 according to the present embodiment.

In a configuration of FIG. 16, a check point generation unit 28 is added in comparison with a configuration of FIG. 5.

The check point generation unit 28 changes the definition contents of the check point file 270, in accordance with an instruction of the user (the system manager).

The check point generation unit 28 corresponds to an example of a definition information change unit.

Further, although it is not illustrated in FIG. 15, a check point generation program that realizes the check point generation unit 28 is included in the programs 17.

The CPU 11 executes the check point generation program so that a function of the check point generation unit 28 described below is realized.

Figure 17:
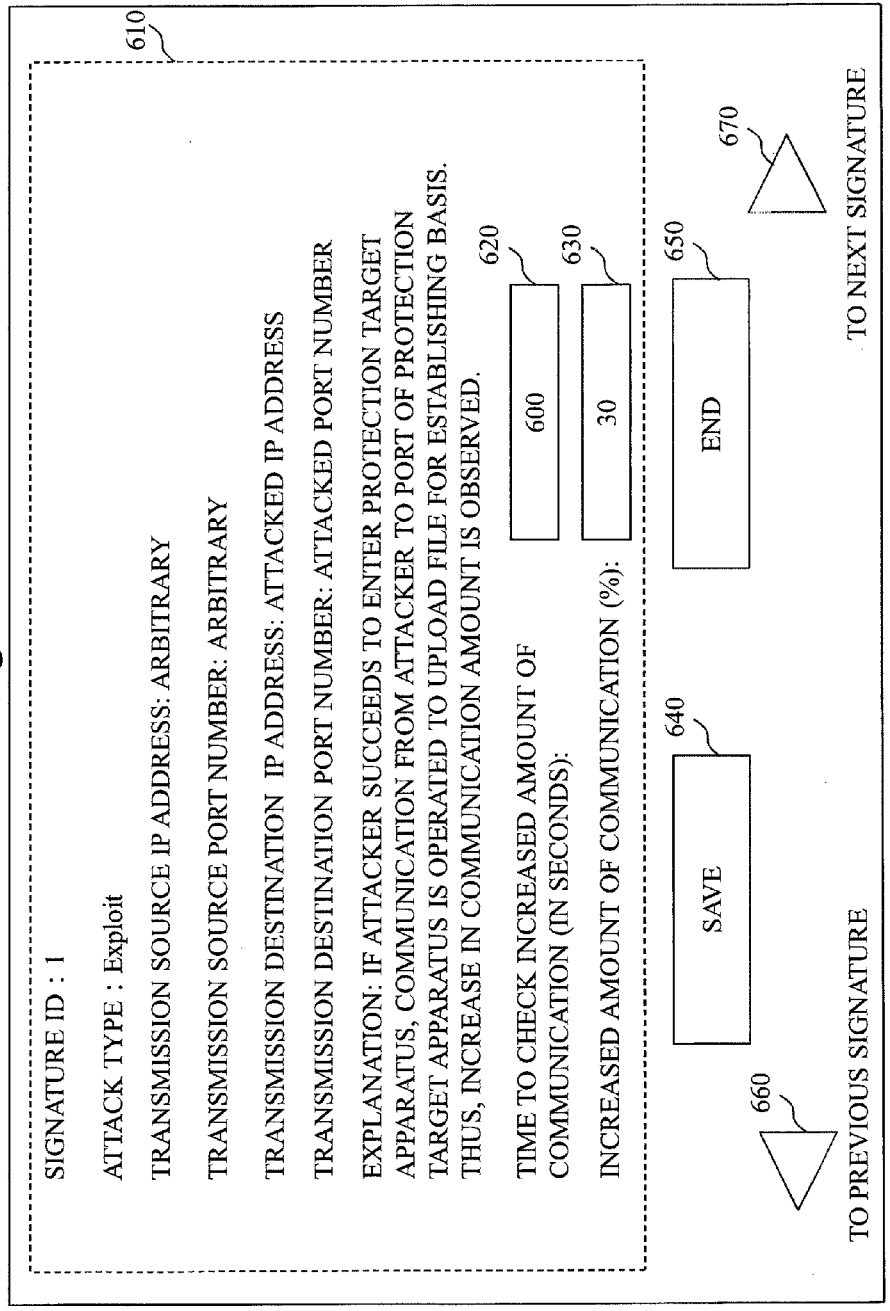
FIG. 17 is a diagram illustrating an operation screen image of a check point generation unit according to the second embodiment.

FIG. 17 illustrates an operation screen image of the check point generation unit 28.

An operation screen displays a check point explanation 610 and displays an input field (a reference sign 620 and a reference sign 630 in the case of FIG. 17) for a changeable element of the check point.

FIG. 17 is the operation screen with respect to the check point of the signature ID: 1 in FIG. 9.

The reference sign 620 indicates that the number (600: 600) of seconds of the check time period 57 is changeable.

The reference sign 630 indicates that the criterion (+30%) of the total size of the determination criterion 59 is changeable.

A save button 640, an end button 650, a go button 660 to the previous signature, and a go button 670 to the next signature, are displayed below the check point explanation 610.

An example of FIG. 17 indicates that the number of seconds of the check time period 57 and the criterion of the total size of the determination criterion 59 are changeable as an example. However, any other elements can be a subject of change.

Figure 18:
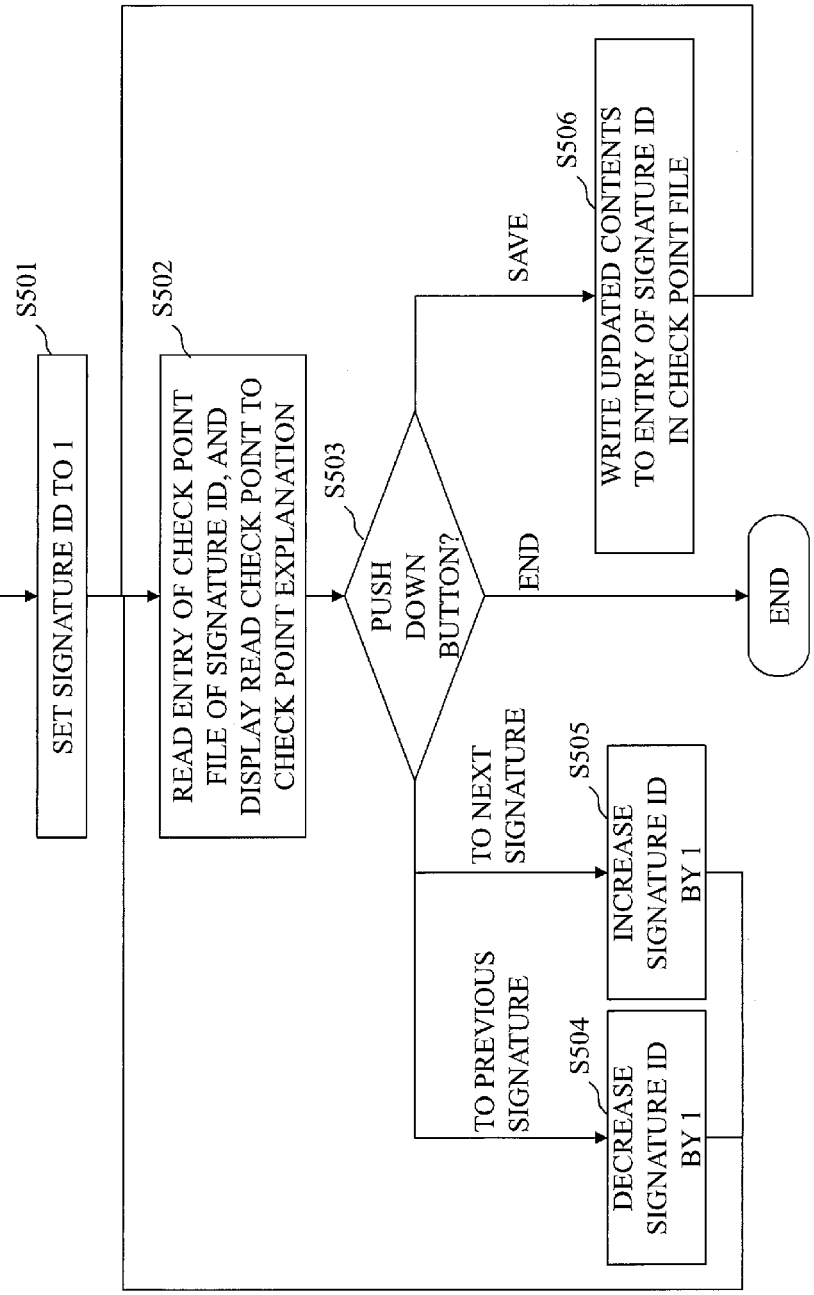
FIG. 18 is a flowchart diagram illustrating an operation example of the check point generation unit according to the second embodiment.

Nextly, with reference to a flowchart of FIG. 18, an operation example of the check point generation unit 28 will be described.

When the check point generation unit 28 is started, the check point generation unit 28 sets the signature ID of an internal variable to 1 (step S501).

Nextly, the check point generation unit 28 reads from the check point file 270 a check point of the signature ID set in the signature ID of the internal variable, and displays the contents of the read check point in the check point explanation 610 (step S502).

When a button is pushed down by the user, the check point generation unit 28 checks which button is pushed down (step S503).

When the go button 660 to the previous signature is pushed down, the check point generation unit 28 decreases the signature ID by 1 (step S504) and repeats the processing from the step S502.

When the go button 670 to the next signature is pushed down, the check point generation unit 28 increases the signature ID by 1 (step S505) and repeats the processing from the step S502.

When the save button 640 is pushed down, the check point generation unit 28 writes the contents of the input field to the entry of the corresponding signature ID in the check point file 270 (step S505) and repeats the processing from the step S502.

When the end button 650 is pushed down, the check point generation unit 28 ends the processing.

As just described, according to the present embodiment, the explanation of the check point is displayed to the system manager in accordance with the attack type, and the check time period and the extraction condition are indicated as parameters. Therefore, the system manager can easily set the check point.

The embodiments of the present invention have been described above. These two embodiments may be combined and performed.

Alternatively, of these two embodiments, one of the embodiments may be partially performed.

Alternatively, these two embodiments may be partially combined and performed.

Note that, the present invention is not limited to these embodiments, and various changes can be made to these embodiments as needed.

REFERENCE SIGNS LIST

1: attack detection system; 2: external network; 3: network apparatus; 4: security apparatus; 5: protection target apparatus; 6: attack detection apparatus; 7: monitoring apparatus; 11: CPU; 12: bus; 13: RAM; 14: communication board; 15: storage device; 16: OS; 17: programs; 18: pieces of data; 19: ROM; 21: packet information generation unit; 22: extraction unit; 23: alert processing unit; 24: selection determination unit; 25: packet information storage unit; 26: protection target apparatus-table storage unit; 27: check point file storage unit; 28: check point generation unit; 61: display; 62: keyboard; 63: mouse; 210: packet information generation program; 220: extraction program; 230: alert processing program; 240: selection determination program; 250: packet information; 260: protection target apparatus-table; and 270: check point file.

The invention claimed is:

1. An information processing apparatus collecting a packet a transmission source of which is a protection target apparatus and a packet a transmission destination of which is the protection target apparatus, the information processing apparatus comprising:
processing circuitry to:
generate packet information by setting an entry for each collected packet and describing attribute data of the packet together with occurrence time of the packet for each entry;
store definition information which indicates a plurality of categories of attack and defines an extraction time width and an extraction condition for each category;
select, when a packet which corresponds to any category of the plurality of categories is detected from among the packet the transmission source of which is the protection target apparatus and the packet the transmission destination of which is the protection target apparatus, the extraction time width and the extraction condition defined in the definition information as a selection extraction time width and a selection extraction condition with respect to a category of a detection packet detected, and to specify an extraction time range which starts from the occurrence time of the detection packet and whose width is equal to the selection extraction time width;
extract from the packet information an entry the occurrence time of which is included in the extraction time range and the attribute data of which coincides with the selection extraction condition;
determine presence or absence of an attack to the protection target apparatus based on an extraction result;
change at least any of the extraction time width and the extraction condition defined in the definition information in accordance with an instruction of a user of the information processing apparatus; and
output an alert when the attack to the protection target apparatus is detected as a result of the determination.

2. The information processing apparatus according to claim 1,
wherein the processing circuitry stores the definition information which defines an applying direction of the extraction time width together with the extraction time width and the extraction condition for each category of attack, and
wherein the processing circuitry specifies, when a backward direction is defined in the definition information as the applying direction of the extraction time width with respect to the category of the detection packet, an extraction time range which extends backward for a width of the selection extraction time width from the occurrence time of the detection packet, specifies, when a forward direction is defined in the definition information as the applying direction of the extraction time width with respect to the category of the detection packet, an extraction time range which extends forward for the width of the selection extraction time width from the occurrence time of the detection packet, and specifies, when a backward direction and a forward direction are defined in the definition information as applying directions of extraction time widths with respect to the category of the detection packet, an extraction time range which extends backward for the width of the selection extraction time width from the occurrence time of the detection packet and an extraction time range which extends forward for the width of the selection extraction time width from the occurrence time of the detection packet.

3. The information processing apparatus according to claim 1, wherein the processing circuitry generates the packet information which describes a transmission source address, a transmission source port number, a transmission destination port address, a transmission destination port number, a communication protocol and a size of the collected packet, for each entry as the attribute data, and wherein the processing circuitry stores the definition information which defines any one of a condition for the transmission source address, a condition for the transmission source port number, a condition for the transmission destination address, a condition for the transmission destination port number, a condition for the communication protocol, and a condition for the packet size.

4. The information processing apparatus according to claim 1, wherein the processing circuitry stores the definition information which defines a determination criterion for determining the presence or absence of the attack to the protection target apparatus together with the extraction time width and the extraction condition for each category of attack, and wherein the processing circuitry determines the presence or absence of the attack to the protection target apparatus based on the extraction result and the determination criterion defined in the definition information with respect to the category of the detection packet.

5. The information processing apparatus according to claim 4, wherein the processing circuitry further changes the determination criterion defined in the definition information in accordance with an instruction of a user of the information processing apparatus.

6. The information processing apparatus according to claim 1, wherein the processing circuitry selects the selection extraction time width and the selection extraction condition when the packet which corresponds to any category of the plurality of categories is detected by a security apparatus that inspects the packet the transmission source of which is the protection target apparatus and the packet the transmission source of which is the protection target apparatus.

7. An information processing method which is operated to collect a packet a transmission source of which is a protection target apparatus and a packet a transmission destination of which is the protection target apparatus, the information processing method comprising:

generating packet information by setting an entry for each collected packet and describing attribute data of the packet together with occurrence time of the packet for each entry;

reading out from a storage area, definition information which indicates a plurality of categories of attack and defines an extraction time width and an extraction condition for each category;

selecting when a packet which corresponds to any category of the plurality of categories is detected from among the packet the transmission source of which is the protection target apparatus and the packet the transmission destination of which is the protection target apparatus, the extraction time width and the extraction condition defined in the definition information as a selection extraction time width and a selection extraction condition with respect to a category of a detection packet detected, and specifying an extraction time range which starts from the occurrence time of the detection packet and whose width is equal to the selection extraction time width;

extracting, from the packet information an entry the occurrence time of which is included in the extraction time range and the attribute data of which coincides with the selection extraction condition;

determining presence or absence of an attack to the protection target apparatus based on an extraction result;

changing at least any of the extraction time width and the extraction condition defined in the definition information in accordance with an instruction of a user of the information processing apparatus; and outputting an alert when the attack to the protection target apparatus is detected as a result of the determination.

8. A non-transitory computer readable medium storing a program to cause a computer that collects a packet, a transmission source of which is a protection target apparatus and a packet, a transmission destination of which is the protection target apparatus to execute:

packet information generation processing to generate packet information by setting an entry for each collected packet and describing attribute data of the packet together with occurrence time of the packet for each entry;

definition information reading out processing to read out, from an a storage area, definition information which indicates a plurality of categories of attack and defines an extraction time width and an extraction condition for each category;

selection processing to select, when a packet which corresponds to any category of the plurality of categories is detected from among the packet the transmission source of which is the protection target apparatus and the packet the transmission destination of which is the protection target apparatus, the extraction time width and the extraction condition defined in the definition information as a selection extraction time width and a selection extraction condition with respect to a category of a detection packet detected, and to specify an extraction time range which starts from the occurrence time of the detection packet and whose width is equal to the selection extraction time width;

extraction processing to extract from the packet information an entry the occurrence time of which is included in the extraction time range and the attribute data of which coincides with the selection extraction condition;

determination processing to determine presence or absence of an attack to the protection target apparatus based on an extraction result of the extraction processing;

said program causing the computer to change at least any of the extraction time width and the extraction condition defined in the definition information in accordance with an instruction of a user of the information processing apparatus; and wherein said determination processing outputs an alert when the attack to the protection target apparatus is detected as a result of the determination.

* * * * *